United States Patent
McDonough

(10) Patent No.: US 9,953,343 B2
(45) Date of Patent: Apr. 24, 2018

(54) DEAL-SURFACING BUTTON

(71) Applicant: GOOGLE INC., Mountain View, CA (US)

(72) Inventor: Colin Albright McDonough, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 132 days.

(21) Appl. No.: 13/929,744

(22) Filed: Jun. 27, 2013

(65) Prior Publication Data
US 2016/0140610 A1    May 19, 2016

(51) Int. Cl.
*G06Q 30/02* (2012.01)
(52) U.S. Cl.
CPC ..... *G06Q 30/0257* (2013.01); *G06Q 30/0222* (2013.01); *G06Q 30/02* (2013.01)
(58) Field of Classification Search
CPC ...................................................... G06Q 30/02
USPC .......................................................... 705/14
See application file for complete search history.

(56) References Cited

U.S. PATENT DOCUMENTS

| | | | |
|---|---|---|---|
| 2001/0023407 A1* | 9/2001 | Liyanearachchi et al. | 705/14 |
| 2002/0107733 A1* | 8/2002 | Liu et al. | 705/14 |
| 2005/0144074 A1* | 6/2005 | Fredregill | G06Q 20/102 705/14.27 |
| 2006/0015405 A1* | 1/2006 | Bala | G06Q 30/02 705/14.66 |
| 2009/0319348 A1* | 12/2009 | Khosravy | G01C 21/20 705/14.1 |
| 2010/0153990 A1* | 6/2010 | Ress | G06Q 30/02 705/14.49 |
| 2010/0257020 A1* | 10/2010 | Bryant et al. | 705/10 |
| 2011/0191184 A1* | 8/2011 | Blackhurst et al. | 705/14.57 |
| 2012/0215610 A1* | 8/2012 | Amaro | G06Q 30/02 705/14.23 |
| 2012/0246015 A1 | 9/2012 | Bennett et al. | |
| 2012/0323664 A1 | 12/2012 | Klems | |
| 2013/0211919 A1* | 8/2013 | Doherty | 705/14.64 |
| 2013/0339115 A1* | 12/2013 | Soldate | 705/14.23 |

FOREIGN PATENT DOCUMENTS

WO    WO 2002/097569 A2    12/2002

* cited by examiner

*Primary Examiner* — Vincent M Cao
(74) *Attorney, Agent, or Firm* — Johnson, Marcou & Isaacs, LLC

(57) ABSTRACT

Auto-detecting an action on a merchant service and rendering an offer button to display an offer redeemable based on the action. A user accesses a merchant service and an indication of the action is communicated to an offer system that maintains an account for the user. The offer system determines whether the user has an offer applicable to a purchase with the merchant. The user device presents an offer button rendered to indicate that the first offer is available for redemption by the user. The user initiates an action on the merchant service and the user device communicates an indication of the action to the offer system. The offer system determines if the user has a second offer applicable to a purchase with the merchant based on the action taken by the user and the offer button is rendered to indicate that the second offer is available for redemption.

21 Claims, 9 Drawing Sheets

DEAL-SURFACING BUTTON

TECHNICAL FIELD

The present disclosure relates generally to an offer system, and more particularly to methods and systems that render an offer button or control on a merchant application displaying an offer indication.

BACKGROUND

Merchants offer coupons or rebates as incentives for purchasing particular products. Traditionally, coupons are distributed in a paper format. A user redeems the coupon by taking the physical coupon to a merchant and purchasing a product that satisfies the terms of the coupon. Other forms of traditional coupons include rebates for purchasing particular products, wherein after purchasing a product that satisfies the terms of the rebate offer, the user fills out and returns required forms to request the rebate.

More recently, merchants have offered electronic offers. Such offers may be linked to merchant loyalty cards, wherein a user enrolls in a merchant's loyalty program and receives a loyalty card. A user then associates certain discounts to the loyalty card and redeems these discounts by presenting the loyalty card (or some form of identifying information, such as a telephone number) and the method of payment to the merchant when purchasing the discounted products. Alternatively, coupons and offers are distributed through electronic media, forums, and social networks.

With the advent of online marketplaces and shopping applications for smart devices, users can copy/paste, click a link, or otherwise manually enter offer codes when completing a transaction with a merchant to receive a discount associated with the code. The user is required to search for codes that apply to the merchant and/or the items in the user's shopping basket.

SUMMARY

In certain example aspects described herein, a method for rendering controls on merchant services comprises an offer created by a merchant system, manufacturer system, and/or alternative offer provider that is distributed to potential users. The user accesses a merchant service (for example, a merchant shopping application or an online shopping website, on a user device). An input indicating that the user has accessed the merchant service is communicated by the user device to an offer system that maintains an account for the user. The offer system receives the input and determines whether the user has an offer applicable to a purchase with the merchant. The offer system communicates a first offer to the user device, and the user device presents an offer control or button on a user interface of the user device. The offer button is rendered to indicate that the first offer is available for redemption by the user (for example, by displaying text of the offer, flashing a color, or displaying an animation).

The user initiates an action on the merchant service (for example, selects an item to display more information, selects to put the item on a wish list or in a shopping basket, enters shipping information, or selects to pay with a digital wallet account). The user device communicates an indication of the action to the offer system, and the offer system determines if the user has a second offer applicable to a purchase with the merchant based on the action taken by the user. The offer system communicates the second offer to the user device, and the user device renders the offer button to indicate that the second offer is available for redemption by the user.

Selection of the offer button applies the offer currently associated with the button to the transaction.

These and other aspects, objects, features, and advantages of the example embodiments will become apparent to those having ordinary skill in the art upon consideration of the following detailed description of illustrated example embodiments.

DETAILED DESCRIPTION OF THE EXAMPLE EMBODIMENTS

Overview

Figure 1:
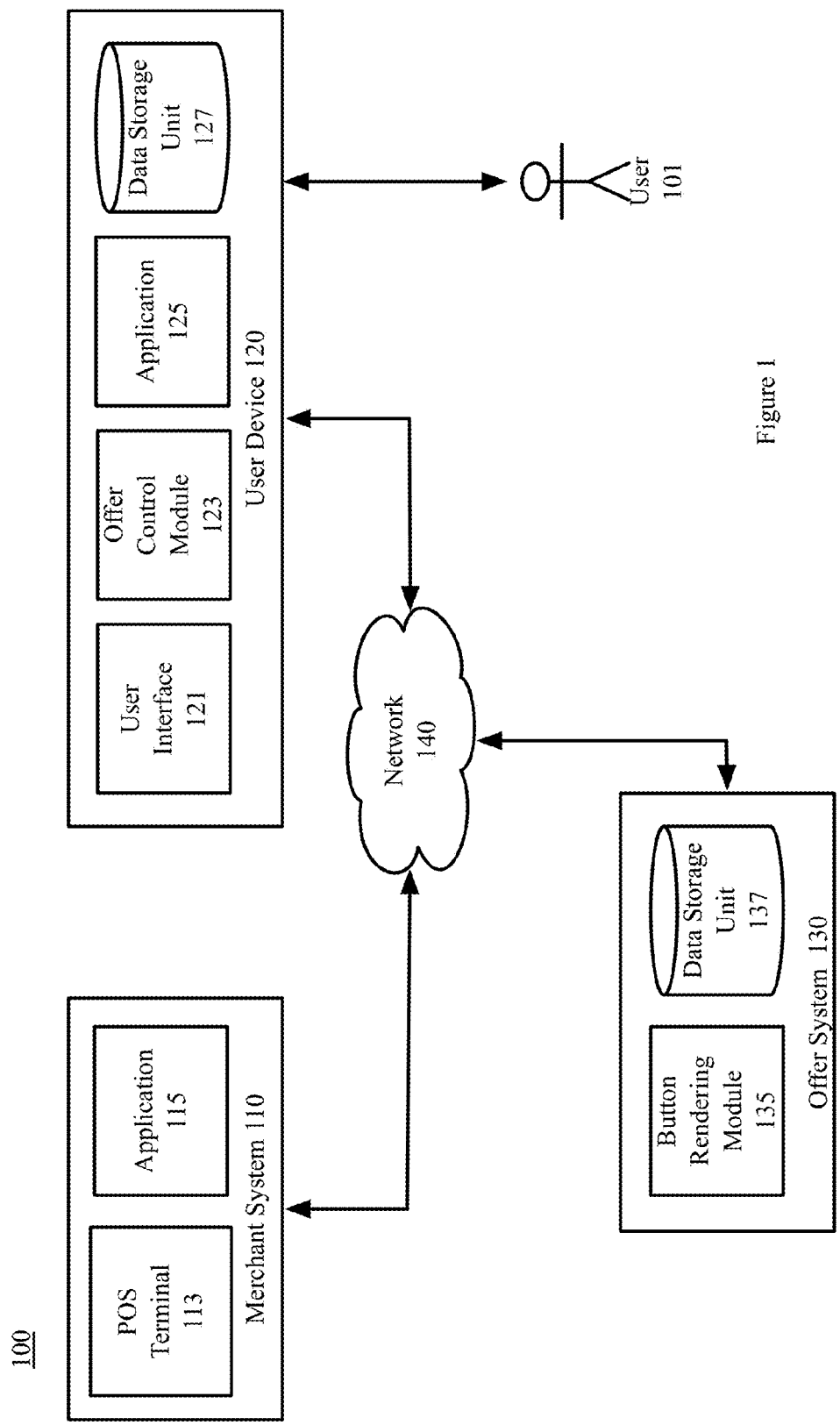
FIG. 1 is a block diagram depicting an offer system, in accordance with certain example embodiments.

The example embodiments described herein provide computer-implemented techniques for rendering an offer button or control on a merchant service displaying an offer indication. In an example embodiment, a user accesses a merchant application on a user device (for example, a merchant shopping application), and a control button is rendered on the merchant application that displays a value or other indication of an offer applicable to the user's transaction. For example, the user has an offer for free shipping for any purchase with Merchant A. When the user accesses Merchant A's shopping application, the control button is rendered to display the text "FREE SHIPPING." In another example, the user has an offer for $10 off a $50 purchase with Merchant B. When the user selects an item that brings the shopping basket total over $50 while shopping Merchant B's electronic storefront, the control button is rendered to flash "$10 OFF." In yet another example, the user has an offer for $5 off a purchase with any merchant when a digital wallet account managed by Offer System X is used to pay for a purchase. When the user accesses Merchant C's shopping application, the control button is rendered to display a yellow flashing button.

An offer is created by a merchant system, manufacturer system, offer system, and/or alternative offer provider and distributed to potential users. In an example embodiment, the offer is a non-prepaid offer for which the user does not pay a fee to obtain (for example, a loyalty reward, a coupon, discounts, or other offer redeemable with a merchant, manufacturer, service provider, and/or provider of goods). In another example embodiment, the offer is a prepaid offer, and the user pays a predetermined price for the products associated with the offer.

The offer comprises redemption terms that specify one or more of a redemption period, a purchase transaction minimum, and a product description applicable to the redemption of the offer. The offer also comprises discount information that specifies the cash value or loyalty point exchange rate of the offer. The offer system distributes the offer and may selectively send potential offers to the user. The offer system also may rank and prioritize the offers sent to a user.

The user operates a user computing device to select one or more offers distributed by the offer system or by others through various distribution channels. In an example embodiment, the user selects the offer by clicking on it, pressing a button to "save" the offer, or by other suitable operation to indicate a desire to select and/or save the offer. In another example embodiment, the offer is a prepaid offer, and the user selects the offer by agreeing to purchase the offer. The user can download, select, scan, or otherwise capture the offer via the user computing device and import the offer specifics (such as merchant, product, value, redemption rules, and other specifics) to the user computing device. By selecting the offer, the user indicates a desire to save the offer in a user account maintained by the offer system.

The user requests access to the merchant application. In an example embodiment, the user has previously logged into a transferable and recognizable global account that is associated with the merchant application. In this embodiment, the merchant application is associated with another web browser, so the user's login information from one page is transferred to the associated merchant application. In another example embodiment, the user has previously logged into the merchant application, and the user's login information was stored by the merchant application so that the user is not prompted to re-enter his login information when returning to the web page. In yet another example embodiment, the user logs into a system account so that when the user enters a web page, the user's registration information is known or provided to the merchant application. In another example embodiment, the user's registration information is known by the offer system, or the user is prompted to log into the offer system prior to entering the merchant application. In yet another example embodiment, the user has previously logged into an operating system level account and/or offer system account on the user device. In this embodiment, the merchant application is associated with the operating system level account and/or the offer system account.

The merchant application loads on the user device, and an offer button is rendered on the merchant application. An offer control module initiates a request to authenticate the user's offer system account status. In an example embodiment, the offer control module functions as an intermediary between the merchant application and the offer system such that all relevant information is passed between the merchant application and the offer system through the offer control module. The offer control module communicates the request to the offer system, and the offer system determines the user's account status. In an example embodiment, information for determining whether the user has an offer applicable to a purchase with the merchant is communicated to the offer system through the offer control module. For example, the offer system may determine if the user has a global offer applicable to a purchase with the merchant or an offer provided by the offer system applicable to a purchase with any merchant. The offer system communicates the user's account status to the offer control module, and the offer button is rendered to display an indication of the offer applicable to a purchase with the merchant. For example, the offer button can display an offer amount, the color or style of the button can be changed to indicate an offer is applicable, the text displayed on the button can be changed, the button can flash or display animations, or other suitable indications of the available offer.

The user initiates an action via the merchant application. For example, the user may select an item to be placed in or removed from the user's shopping basket, enter shipping information or payment information, add or remove an item to a wish list or registry, select an item to view reviews or otherwise request additional information about an item or group of items. For each action taken by the user, the offer control module receives a load event for the user's action performed on the merchant application and communicates the action to the offer system by communicating the load event information. In an example embodiment, the offer control module receives notification of any combination of a user action and/or a change in the current state of the user's shopping basket, wish list, or registry. The offer system determines if the user has an offer applicable to a purchase with the merchant based on the newly communicated information, and the offer system communicates the user's account status to the offer control module. The offer button is rendered to display an indication of the offer applicable to a purchase with the merchant based on the action taken by the user.

The inventive functionality of the invention will be explained in more detail in the following description, read in conjunction with the figures illustrating the program flow.

Example System Architectures

Turning now to the drawings, in which like numerals indicate like (but not necessarily identical) elements throughout the figures, example embodiments are described in detail.

FIG. 1 is a block diagram depicting an offer system, in accordance with certain example embodiments. As depicted in FIG. 1, the example operating environment 100 includes a merchant system 110, a user device 120, and an offer system 130 that are configured to communicate with one another via one or more networks 140. In another example embodiment, two or more of these systems (including systems 110, 120, and 130) or parts thereof are integrated into the same system.

Each network 140 includes a wired or wireless telecommunication means by which network systems (including systems 110, 120, and 130) can communicate and exchange data. For example, each network 140 can be implemented as, or may be a part of, a storage area network (SAN), personal area network (PAN), a metropolitan area network (MAN), a local area network (LAN), a wide area network (WAN), a wireless local area network (WLAN), a virtual private network (VPN), an intranet, an Internet, a mobile telephone network, a card network, Bluetooth, near field communication network (NFC), any form of standardized radio frequency, or any combination thereof, or any other appropriate architecture or system that facilitates the communication of signals, data, and/or messages (generally referred to as data). Throughout this specification, it should be understood that the terms "data" and "information" are used interchangeably herein to refer to text, images, audio, video, or any other form of information that can exist in a computer-based environment.

In an example embodiment, each network system (including systems 110, 120, and 130) includes a device having a communication module capable of transmitting and receiving data over the network 140. For example, each network system (including systems 110, 120, and 130) may comprise a server, personal computer, mobile device (for example, notebook computer, tablet computer, netbook computer, personal digital assistant (PDA), video game device, GPS locator device, cellular telephone, Smartphone, or other mobile device), a television with one or more processors embedded therein and/or coupled thereto, or other appropriate technology that includes or is coupled to a web browser or other application for communicating via the network 140. In the example embodiment depicted in FIG. 1, the network systems (including systems 110, 120, and 130) are operated by merchants, users 101, and an offer system operator, respectively.

The merchant system 110 comprises at least one point of sale ("POS") terminal 113 that is capable of processing a purchase transaction initiated by a user 101 (for example, a cash register). In an example embodiment, the merchant operates an online store and the user 101 indicates a desire to make a purchase by clicking a link or "checkout" button on a website. In another example embodiment, the merchant operates a merchant shopping application and the user 101 indicates a desire to make a purchase by clicking a link or "checkout" button on the application. In another example embodiment, the user device 120 is configured to perform the functions of the POS terminal 113. In this example, the user 101 scans and/or pays for the transaction via the user device 120 without interacting with the POS terminal 113.

In an example embodiment, the merchant system 110 is capable of communicating with the user device 120 via an application 115. The application 115 may be an integrated part of the POS terminal 113 or a standalone hardware device (not shown), in accordance with other example embodiments.

In an example embodiment, the user device 120 may be a personal computer, mobile device (for example, notebook, computer, tablet computer, netbook computer, personal digital assistant ("PDA"), video game device, GPS locator device, cellular telephone, Smartphone or other mobile device), television, or other appropriate technology that includes or is coupled to a web server, or other suitable application for interacting with web page files. The user 101 can use the user device 120 to access a merchant system 110 service (for example, a shopping website or shopping application) via a user interface 121 and an application 125. The application 125 is a program, function, routine, applet or similar entity that exists on and performs its operations on the user device 120. For example, the application 125 may be one or more of a shopping application, merchant system 110 application, an Internet browser, a digital wallet application, a loyalty card application, another value-added application, a user interface 121 application, or other suitable application operating on the user device 120. In some embodiments, the user 101 must install an application 125 and/or make a feature selection on the user device 120 to obtain the benefits of the techniques described herein.

In an example embodiment, the data storage unit 127 and application 125 may be implemented in a secure element or other secure memory (not shown) on the user device 120. In another example embodiment, the data storage unit 127 may be a separate memory unit resident on the user device 120. An example data storage unit 127 enables storage of user contact details and offers for retrieval of a user offer system 130 account. In an example embodiment, the data storage unit 127 can include any local or remote data storage structure accessible to the user device 120 suitable for storing information. In an example embodiment, the data storage unit 127 stores encrypted information, such as HTML5 local storage.

An example user device 120 comprises an offer control module 123. An example offer control module 123 is an application plug-in corresponding to the offer system 130. In another example embodiment, the offer control module 123 is a browser plug-in corresponding to the offer system 130. The offer control module 123 may be an integrated part of the application 125, an integrated part of the offer system 130, or a stand along hardware device (not shown), in accordance with other example embodiments. The user 101 installs the offer control module 123 on the user device 120 to facilitate auto-detection of actions on merchant system 110 service, communicate actions to the offer system 130, receive notification of offers available for redemption based on the actions, and render an offer control or button on the user interface 121 to display an indication of the offer available for redemption. In an example embodiment, the application 125 communicates with the offer control module 123. For example, the application 125 provides data to the offer control module 123 to allow for the detection of specific load events, such as the loading of the merchant system's 110 shopping application, shopping basket, and product information. In an example embodiment, the offer control module 123 comprises application programming interfaces ("APIs") that allow the module 123 to interact and communicate with the application 125.

An example offer control module 123 communicates with the offer system 130. For example, the offer control module 123 transmits load event information to the offer system 130 when action on the merchant system 110 shopping application is detected. An example offer system 130 comprises a button rendering module 135 and a data storage unit 137. The offer system 130 maintains an account for the user 101. An example user 101 account comprises one or more offers. In an example embodiment, the offer system 130 receives offers from the merchant system 110, a manufacturer system (not shown) and/or other offer creators and distributes the offers to users 101 for review and selection. In an example embodiment, the offer system 130 creates the offers. In another example embodiment, the offer system 130 may generate web-based user interfaces providing forms for the merchant system 110 to create offers. In an example embodiment, the user account maintained by the offer system 130 comprises an electronic record having associated therewith one or more offers.

The user 101 may be automatically prompted with one or more offers based on the user's registration information immediately after completing the registration process. In another example embodiment, the user 101 may be prompted to register with the offer system 130 when the user 101 clicks on or selects an offer. In an example embodiment, the user 101 may use a smart phone application 125 to register with the offer system 130. In another example embodiment, the user 101 may register with the offer system 130 through the user's digital wallet.

The offers are distributed through selected distribution channels. In an example embodiment, the distribution channels comprise one or more of a display on cost per mille impression ("CPM") or pay per click ("PPC") impression, electronic correspondence distribution, SMS distribution, display based on geo-fencing, user device 120 map display, display in response to an Internet search, and display on an offer website. In another example embodiment, the offers are selectively presented to users based on the user's offer system 130 account information. The merchant system 110 specifies the details of the offer, by selecting the type of offer, the duration, the discount amount or percentage, redemption rules, and additional pertinent details when creating the offer. In an example embodiment, the offers are distributed directly by the merchant system 110 or a third party without offer system 130 involvement.

The selected offers are saved in the data storage unit 137. In an example embodiment, the data storage unit 137 can include any local or remote data storage structure accessible to the account management system 130 suitable for storing information. In an example embodiment, the data storage unit 137 stores encrypted information, such as HTML5 local storage.

In an example embodiment, each offer will have one or more structured rules or conditions that the offer system 130 can understand without human intervention. These rules include, but are not limited to, a purchase threshold (for example, receive $10 back on a single purchase of more than $50 from the merchant), an aggregate purchase threshold (for example, receive $10 back from the next purchase from the merchant after the accumulated purchase at merchant has reached $1000), a minimum number of purchases from the merchant (for example, receive $10 back on your tenth purchase from the merchant), a time restriction (for example, receive $10 back for a lunch-time purchase), a location restriction (for example, receive $10 back from a purchase at a specified merchant location), a product or category restriction (for example, receive $10 back when you purchase a specific product or a product from a specific department), an expiration date, a limited number of redemptions, and pre-payment terms. In another example embodiment, the offer is a prepaid offer or other offer, and the redemption rules include an expiration date. In an example embodiment, the offers may include, but are not limited to, coupons, loyalty points, prepaid offers, rebates, and other forms of value added services.

In an example embodiment, these rules are set by the merchant system 110 at the time the offer is created and reviewed by the offer system 130 before the offer is applied. In an example embodiment, the user's 101 selected offer is not redeemable because the one or more structured rules or conditions are not met (for example, the redemption term has expired, the offer has exceeded the maximum number of allotted redemptions, the purchase transaction amount is less than the minimum purchase transaction amount for the offer, or the description of the products purchased does not match the description of the products in the selected offer). In another example embodiment, the offer rules are reviewed by the offer rendering module 135 or another module (not shown) on the user device 120.

The button rendering module 135 receives the load event information for action taken on the merchant system 110 shopping application from the offer control module 123 and retrieves applicable offers from the user's 101 offer system account. In an example embodiment, the button rendering module 135 receives load event information indicating that the user 101 has accessed the merchant system 110 shopping application. The button rendering module 135 determines whether the user 101 has an offer applicable to any purchase with the merchant system 110. Once an offer is identified, the button rendering module 135 communicates the offer to the offer control module 123. In an example embodiment, the button rendering module 135 communicates an indication of how the offer button will be rendered on the user interface 121. In another example embodiment, the button rendering module 135 communicates the details of the offer to the offer control module 123 and the offer control module 123 determines how the offer button will be rendered. In yet another example embodiment, the button rendering module 135 is split across multiple system (for example systems 130 and 120). In an example embodiment, a portion of the button rendering module 135 on the offer system 130 may render part of the offer button and send the information to the portion of the button rendering module 135 on the user device 120. The portion of the button rendering module 135 on the user device combines the information received with additional details to render the offer button. In another example embodiment, the button rendering module 135 on the user device 120 sends information to the button rendering module 135 on the offer system 130.

Figure 6:
FIG. 6 is a block diagram depicting a user interface displaying an offer button rendered on a merchant system shopping application to display an offer amount when a user accesses the merchant system shopping application, in accordance with certain example embodiments.

FIG. 6 is a block diagram depicting a user interface 121 displaying an offer button 610 rendered on a merchant system 110 shopping application to display an offer amount when the user 101 accesses the merchant system 110 shopping application, in accordance with certain example embodiments. As depicted in FIG. 6, the example operating environment 600 comprises a user device 120, a user interface 121, and an offer button 610. Once the user 101 accesses the merchant system 110 shopping application, the offer control module 123 communicates the action to the offer system 130, and the offer button 610 is rendered to display an offer capable of redemption based on the user 101 accessing the merchant system 110 shopping application. As depicted in FIG. 6, the user interface 121 displays the rendered offer button 610.

Figure 7:
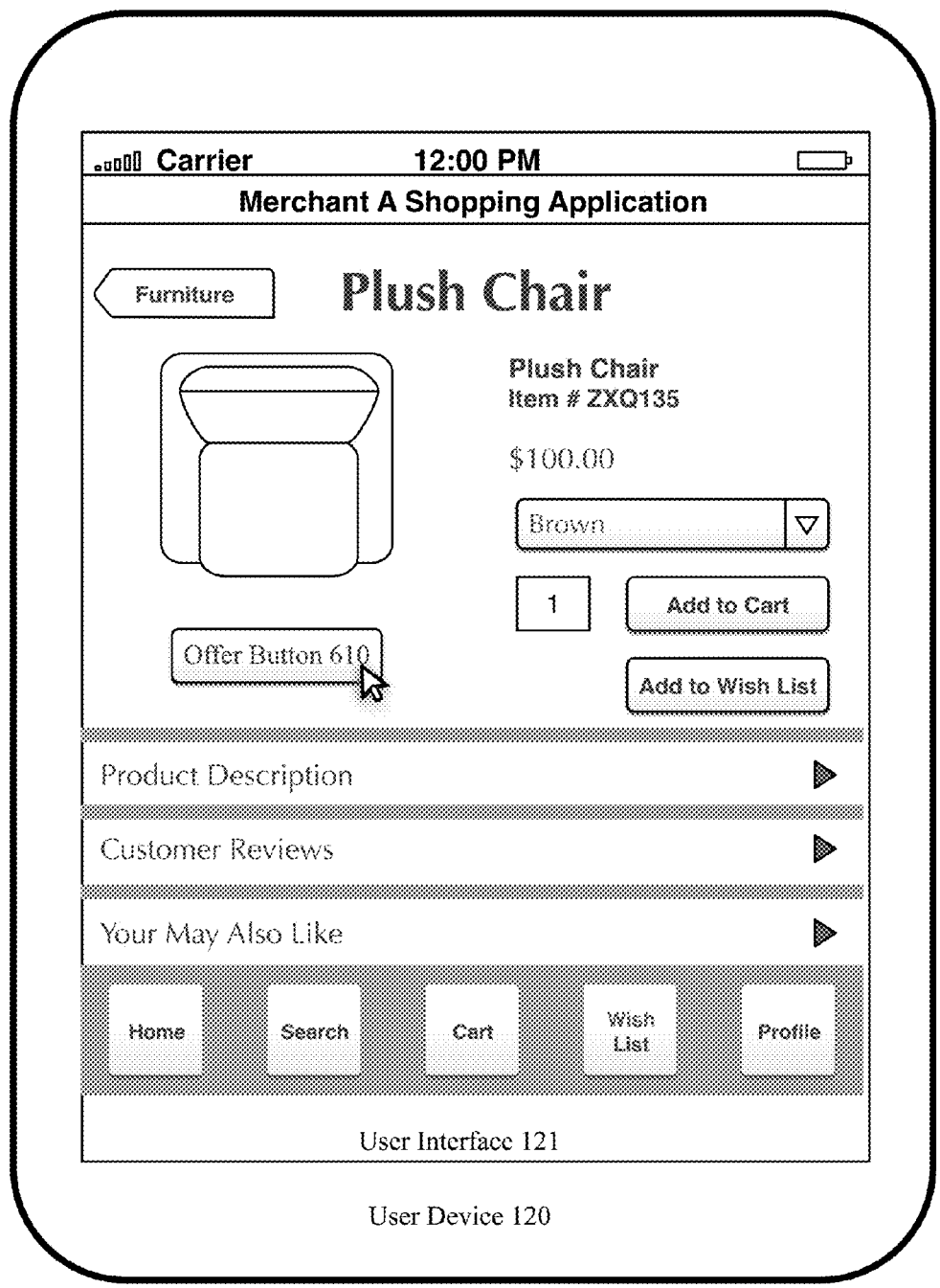
FIG. 7 is a block diagram depicting a user interface displaying an offer button rendered on a merchant system shopping application product page to display an offer amount when a user selects an item to display more information, in accordance with certain example embodiments.

FIG. 7 is a block diagram depicting a user interface 121 displaying the offer button 610 rendered on a merchant system 110 shopping application product page to display an offer amount when the user 101 selects an item to display more information, in accordance with certain example embodiments. As depicted in FIG. 7, the example operating environment 700 comprises a user device 120, a user interface 121, and an offer button 610. Once the user 101 selects an item, the offer control module 123 communicates the action to the offer system 130, and the offer button 610 is rendered to display an offer capable of redemption based on the user 101 selecting the item in the merchant system 110 shopping application. As depicted in FIG. 7, the user interface 121 displays the rendered offer button 610.

Figure 8:
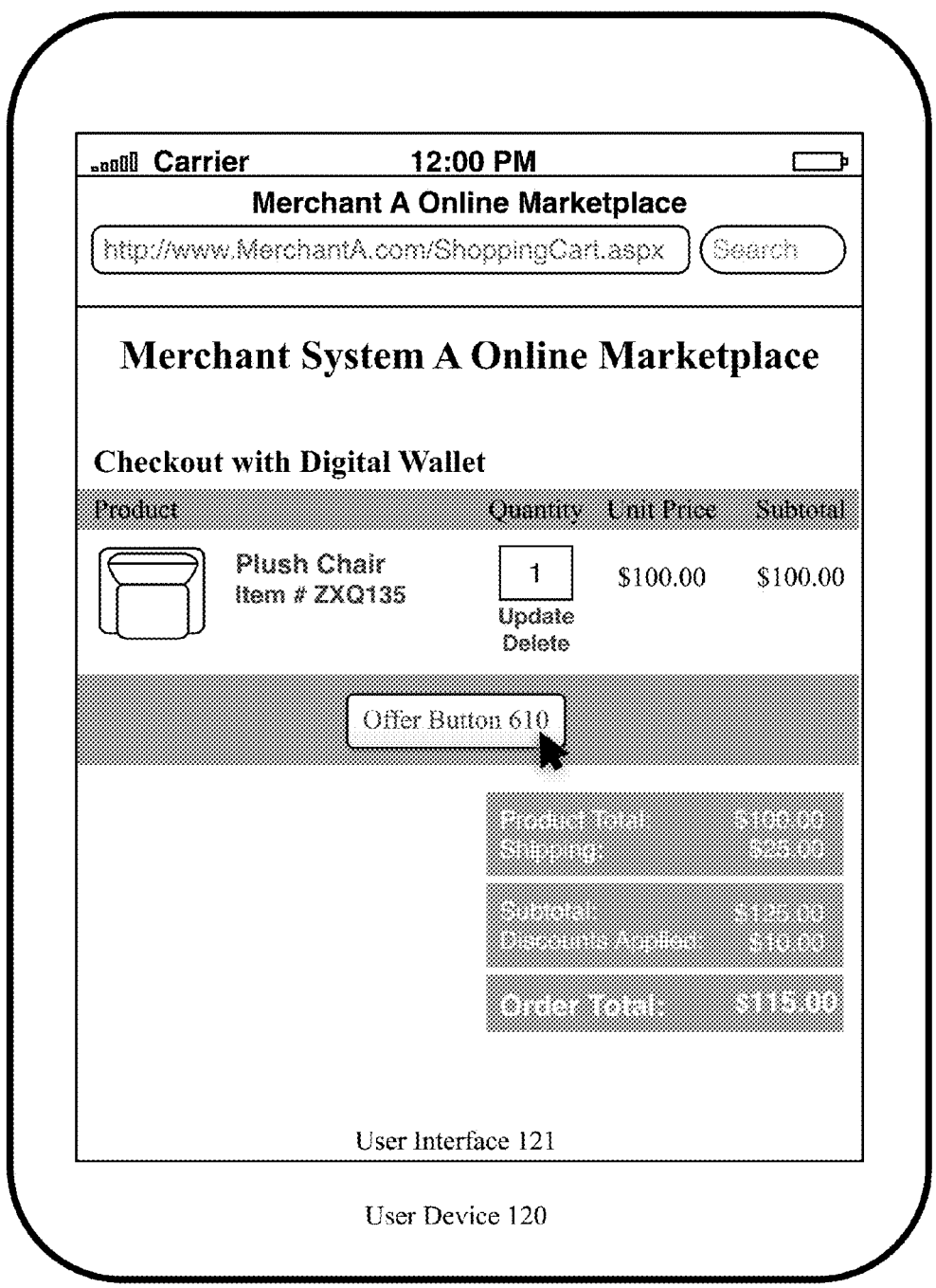
FIG. 8 is a block diagram depicting a user interface displaying an offer button rendered on an online merchant system shopping basket to display an offer amount when a user pays with a digital wallet account, in accordance with certain example embodiments.

FIG. 8 is a block diagram depicting a user interface 121 displaying an offer button 610 rendered on an online merchant system 110 shopping basket to display an offer amount when the user 101 pays with a digital wallet account, in accordance with certain example embodiments. As depicted in FIG. 8, the example operating environment 800 comprises a user device 120, a user interface 121, and an offer button 610. Once the user 101 indicates a desire to pay with the user's 101 digital wallet account, the offer control module 123 communicates the action to the offer system 130, and the offer button 610 is rendered to display an offer capable of redemption based on the user 101 indicating a desire to pay with the user's 101 digital wallet account. As depicted in FIG. 8, the user interface 121 displays the rendered offer button 610.

The components of the example operating environments 100, 600, 700, and 800 are described hereinafter with reference to the example methods illustrated in FIGS. 2-5. The example methods of FIGS. 2-5 may also be performed with other systems and in other environments.

Example System Processes

Figure 2:
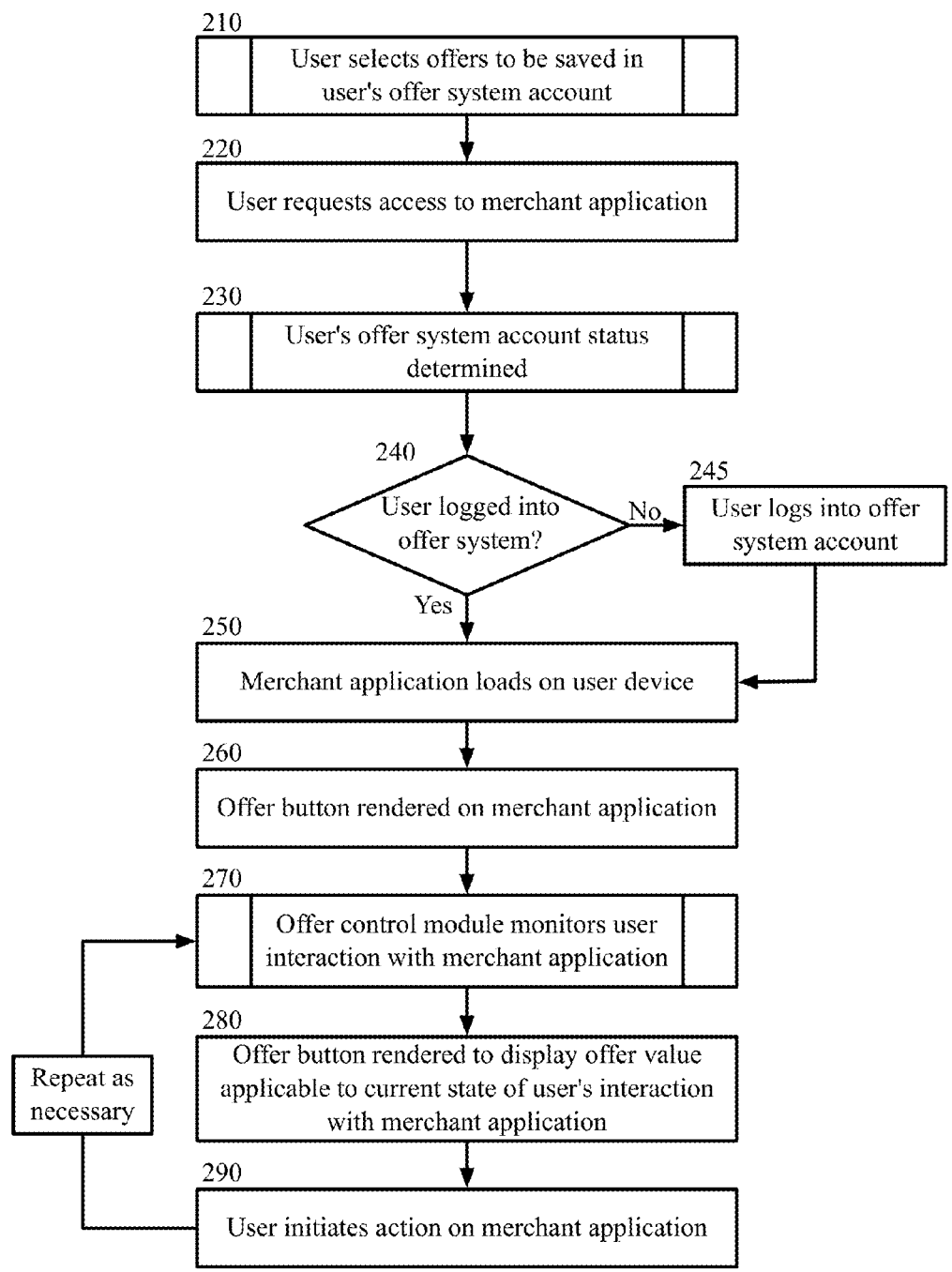
FIG. 2 is a block flow diagram depicting a method for rendering an offer button, in accordance with certain example embodiments.

FIG. 2 is a block flow diagram depicting a method for rendering an offer button 610, in accordance with certain example embodiments. The method 200 is described with reference to the components illustrated in FIG. 1.

In block 210, a user 101 selects one or more offers to be saved in the user's 101 offer system 130 account. In an example embodiment, offers are created by the merchant system 110, the manufacturer system (not shown), offer system (130), or another third party system (not shown) and be distributed by the offer system 130. In another example embodiment, the offers are created by the offer system 130 or third party system (not shown) on behalf of the merchant system 110, the manufacturer system (not shown), and/or both systems. In another example embodiment, the offers are distributed by the merchant system 110 or a third party system (not shown). In another example embodiment, offers are selected and/or saved in the user's 101 offer system 130 account without user 101 interaction (for example, the offer system 130 transmits offers to be automatically saved in the user's 101 offer system 130 account without the user 101 having to take any action). In another example embodiment, offers are redeemable by any user and not saved to the user's 101 offer system 130 account. In yet another example embodiment, offers may be automatically saved to the user's 101 offer system 130 account.

In an example embodiment, the offers may include, but are not limited to, coupons, loyalty points, prepaid offers, rebates, and other forms of value added services. In this embodiment, the offers may comprise merchant offers, manufacturer offers, third party offers, and other types of offers. In an example embodiment, the offers are for a specific product or group of products. For example, the offer may be for $1.00 off Brand A laundry detergent or $1.00 off a Manufacturer X product. These offers may be redeemed at any merchant that accepts manufacturer coupons. In an alternative example embodiment, the offers are for a particular merchant. For example, the offer may be for $10 off a $50 purchase at Merchant Q. In an alternative example embodiment, the offers comprise loyalty reward point redemptions. For example, the offer may be for 10 loyalty points for every purchase of a Manufacturer X product.

In an example embodiment, the offers comprise details on how the offer can be redeemed and redemption rules. For example, the offer may comprise the identification of the item to be purchased, such as product title, brand information, universal product code ("UPC"), a stock keeping unit ("SKU"), a Japanese article number ("JAN"), a world product code ("WPC"), International Standard Book Number ("ISBN"), European Article Number ("EAN"), color, size, and other relevant sale information.

In an example embodiment, each offer will have one or more rules or conditions associated with it. These rule include, but are not limited to a purchase threshold (for example, receive $1.00 off Brand Z laundry detergent that is regularly priced $5.00 or more, or $10 single purchase of more than $50 from Merchant X), an aggregate purchase threshold (for example, receive $10 off next purchase from a merchant after the accumulated purchase of Manufacturer B products has reached $100), a minimum number of purchases of an item (for example, receive $10 off your tenth purchase of Brand Z items), a time restriction (for example, receive $10 off a lunch-time purchase), a maximum discount (for example, the merchant system 110 sets $10 off as a maximum and user A gets $1 off, while user B gets $2 off), and/or a location restriction (for example, receive $10 off a purchase at a specified location). In an example embodiment, these rules are set by the merchant system 110 at the time the offer is created and reviewed before the offer is applied. In another example embodiment, the offer is a prepaid offer and the redemption rules may include an expiration date. In yet another example embodiment, each offer will have no rules or conditions associated with it. For example, an offer for $10 off any purchase with any merchant. The offer content and discount may be personalized to a particular user. For example, user A may receive a 5% off coupon for a particular product or service while user B may receive a 10% off coupon for the same product or service. The offer system 130 may distribute the offers and selectively send potential offers to the user 101. The offer system 130 may determine which users 101 qualify for a particular offer. The offer system 130 may also rank and prioritize the offers sent to a user.

In an example embodiment, the merchant system 110 creates the offer outside of the offer system 130. In another example embodiment, the offer system 130 may generate web-based user interfaces providing forms for the merchant system 110 to create offers.

In an example embodiment, the offer system 130 receives the offers and redemption terms transmitted by the merchant system 110. In an example embodiment, the offers can be received electronically on a regular basis (for example, daily/weekly), as part of a pull from the offer system 130, and/or as part of a push from the merchant system 110 to the offer system 130. In this embodiment, the pull from the offer system 130 and/or the push from the merchant system 110 can be triggered by a time condition, non-time condition (for example a new offer is available or a location-based condition), or a combination of multiple conditions (for example, between the time of 2 PM and 5 PM for all users in New York).

In an example embodiment, the offer system 130 saves the offer and redemption terms in the data storage unit 137 thereby allowing the offer system 130 to identify the conditions under which the offer is redeemable.

In an example embodiment, the offer system 130 distributes the offers. In an example embodiment, the offer system 130 distributes offers through selected network channels. For example, the offer system 130 communicates the offers via the network 140 for presentation to end users 101 on corresponding user devices 120. The offers can be monitored for interaction by the users 101 in accordance with the various network channels selected by the merchant. In an example embodiment, the network channels comprise display on cost per mille impression ("CPM"), pay per click ("PPC"), cost per action ("CPA"), electronic correspondence, and offers near me. The merchant system 110 may select multiple methods of distribution for the same offer. The merchant system 110 may also create multiple offers to be distributed through the same or different network channels. The merchant system 110 specifies the details of the offer, by selecting the type of offer, the duration, the discount amount or percentage, redemption rules, and additional pertinent details when creating the offer.

In an example embodiment, the user 101 reviews the offers and selects one or more offers to be saved to the user's 101 offer system 130 account. The method for selecting one or more offers is described in more detail hereinafter with reference to the methods described in FIG. 3.

Figure 3:
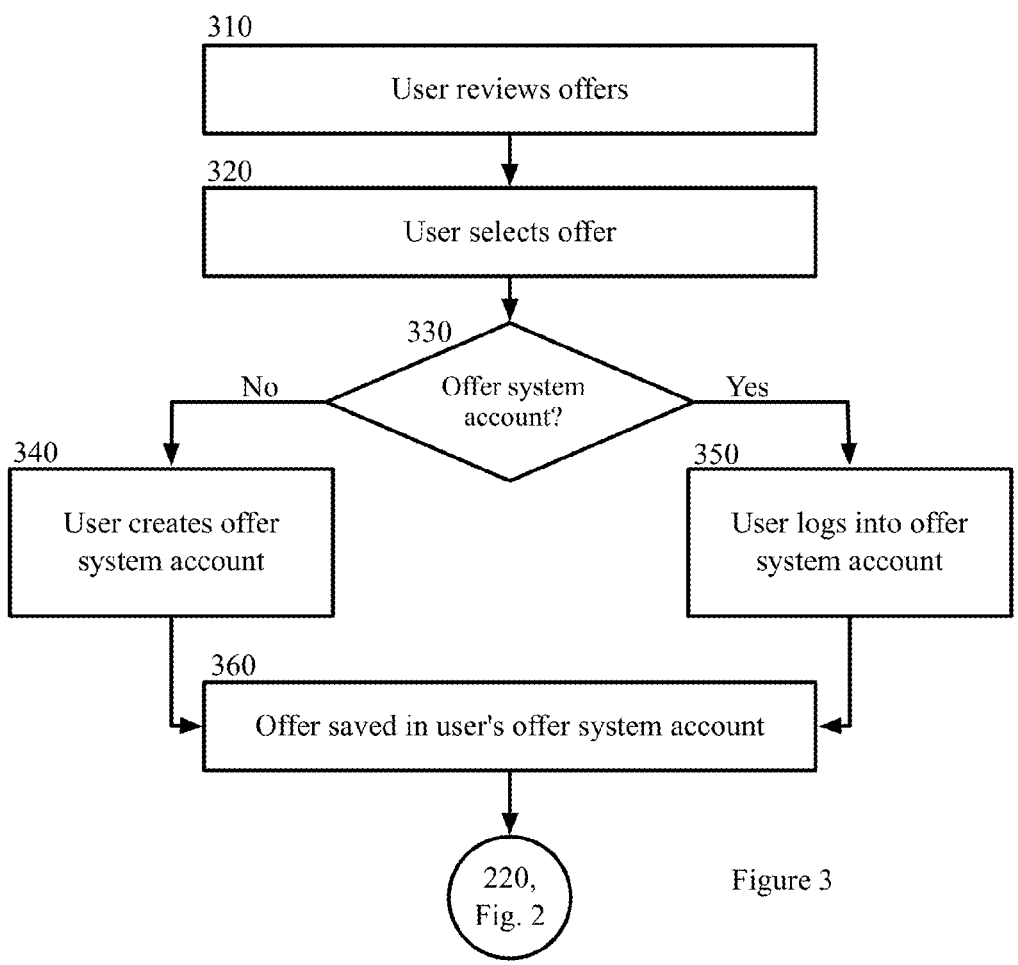
FIG. 3 is a block flow diagram depicting a method for selecting offers, in accordance with certain example embodiments.

FIG. 3 is a block flow diagram depicting a method 210 for selecting one or more offers, in accordance with certain example embodiments, as referenced in block 210. The method 210 is described with reference to the components illustrated in FIG. 1.

In block 310, the user 101 reviews the offers distributed by the offer system 130. In an example embodiment, the user device 120 displays the offer in a web browser for the user 101 to review. In an example embodiment, the offer is displayed in an offer application 125 resident on the user device 120. In another example embodiment, the offer is displayed in response to an Internet search, in an electronic message or text message, or as a banner or other advertisement in an Internet browser.

In block 320, the user 101 selects the offer. In an example embodiment, the user 101 reviews and selects one or more offers. The user 101 select, prepays, agrees to pay for, prints, saves, and/or interacts with the offer. In an example embodiment, the user 101 selects one or more offers distributed by the offer system 130 or by others through the various distribution channels. In an example embodiment, the user 101 selects the offer by clicking on it, pressing a button to "save" the offer, pressing a button to "pay for" the offer, or by other suitable means to indicate a desire to select, pay, and/or save the offer.

The user 101 can download, select, scan, or otherwise capture the offer and import the offer specifics (such as merchant, product, value, redemption rules, and other specifics) to the user device 120. In an example embodiment, the user 101 may register with a merchant system's 110 loyalty rewards program, and offers generated from the loyalty rewards program can be associated with the user device 120. Additionally, the merchant system 110 may implement its loyalty rewards program via the offer system 130 such that each purchase by the user 101 will increment the loyalty rewards. When the user 101 has accumulated sufficient loyalty rewards to qualify for a loyalty rewards offer, the loyalty rewards offer is saved on the user device 120 and then applied when a purchase of the user 101 from the merchant meets the redemption rules for the loyalty rewards offer.

In block 330, the offer system 130 receives a notification that the user 101 has selected the offer and determines whether the user 101 has an offer system 130 account. In an example embodiment, the user 101 is prompted to log into or create an offer system 130 account when the offer is selected and/or paid for. In another example embodiment, the user 101 previously logged into the offer system 130 account and is otherwise automatically logged into the account. In another example embodiment, the user's 101 login credentials are shared across other accounts (for example, social networking websites and user device 120 accounts) and the user 101 is automatically logged into the offer system 130 account using the shared login credentials.

If the user 101 does not have an offer system 130 account, the method 210 proceeds to block 340 and the user 101 is prompted to create an offer system 130 account. In an example, the user 101 is prompted to register with the offer system 130 when the user 101 clicks on or selects the offer. In another example embodiment, the user 101 is prompted to register with the offer system 130 when the user 101 pays for the offer (not pictured in FIG. 3). In another example embodiment, the user 101 is not required to log in or register for an offer system 130 account. In this embodiment, the methods described herein are performed for a "guest" user.

In an example embodiment, the user 101 may create the offer system 130 account at any time prior to or while selecting, saving, or paying for the offer. In an example embodiment, the user 101 accesses the offer system 130 via a website and the network 140. In an example embodiment, the user 101 submits registration information to the offer system 130, including, but not limited to, name, address, phone number, e-mail address, and information for one or more registered financial card accounts, including bank account debit cards, credit cards, a loyalty rewards account card, or other type of account that can be used to make a purchase (for example, card type, card number, expiration date, security code, and billing address). In an example embodiment, the user's offer system 130 account information is saved in the data storage unit 137 and is accessible to the button rendering module 135. In another example embodiment, the user 101 is not required to log into and/or maintain an offer system 130 account. In this embodiment, the offer system 130 maintains offers that may be redeemed by any user.

In an example embodiment, the offer system 130 account is a digital wallet account maintained by the offer system 130 or a third party system. In another example embodiment, the user 101 may use a smart phone application 125 to register with the offer system 130. In yet another example embodiment, the user 101 accesses the offer system 130 via a smart phone application 125.

From block 340, the method 210 proceeds to block 360 in FIG. 3.

Returning to block 330 in FIG. 3, if the user 101 has an offer system 130 account, the user 101 logs into the account in block 350. In an example embodiment, the user's offer system 130 account information is saved in the user device 120 and the user 101 is automatically signed into the user's offer system 130 account. In another example embodiment, the user 101 is automatically logged into the offer system 130 account using shared login credentials. In yet another example embodiment, the user 101 was previously logged into the offer system 130 account and is not required to login.

In block 360, the selected offer is saved in the user's 101 offer system 130 account. In an example embodiment, the offer is saved in the data storage unit 137 and accessible by the button rendering module 135. In an example embodiment, by selecting the offer, the user 101 indicates a desire to save the offer in the user's 101 account maintained by the offer system 130. In another example embodiment, the user 101 can download, select, scan, or otherwise capture the offer via the user device 120 and import the offer specifics (such as merchant, product, value, redemption rules, and other specifics) to the user device 120.

The method 210 then proceeds to block 220 in FIG. 2.

Returning to FIG. 2, in block 220, the user requests access to a merchant application 125. In an example embodiment, the merchant application 125 is a web page, a merchant shopping service, or a stand-alone application 125 and the user 101 requests access by opening the service, logging in, or otherwise initiating the service.

In block 230, the user's 101 offer system 130 account status is determined. In an example embodiment, the user 101 is logged into the offer system 130 to perform the functions described herein. In this embodiment, any offers saved in the user's 101 offer system 130 account can be reviewed and selected for rendering on the control button. In another example embodiment, the user 101 is prompted to log into the user's 101 offer system 130 account. In an example embodiment, determining the user's 101 offer system 130 account status comprises determining whether the user 101 has an offer applicable to a transaction with the merchant (for example, whether the redemption terms of the offer permit the offer to be redeemed with any purchase with the merchant system 110). The method for determining the user's 101 offer system 130 account status is described in more detail hereinafter with reference to the methods described in FIG. 4.

Figure 4:
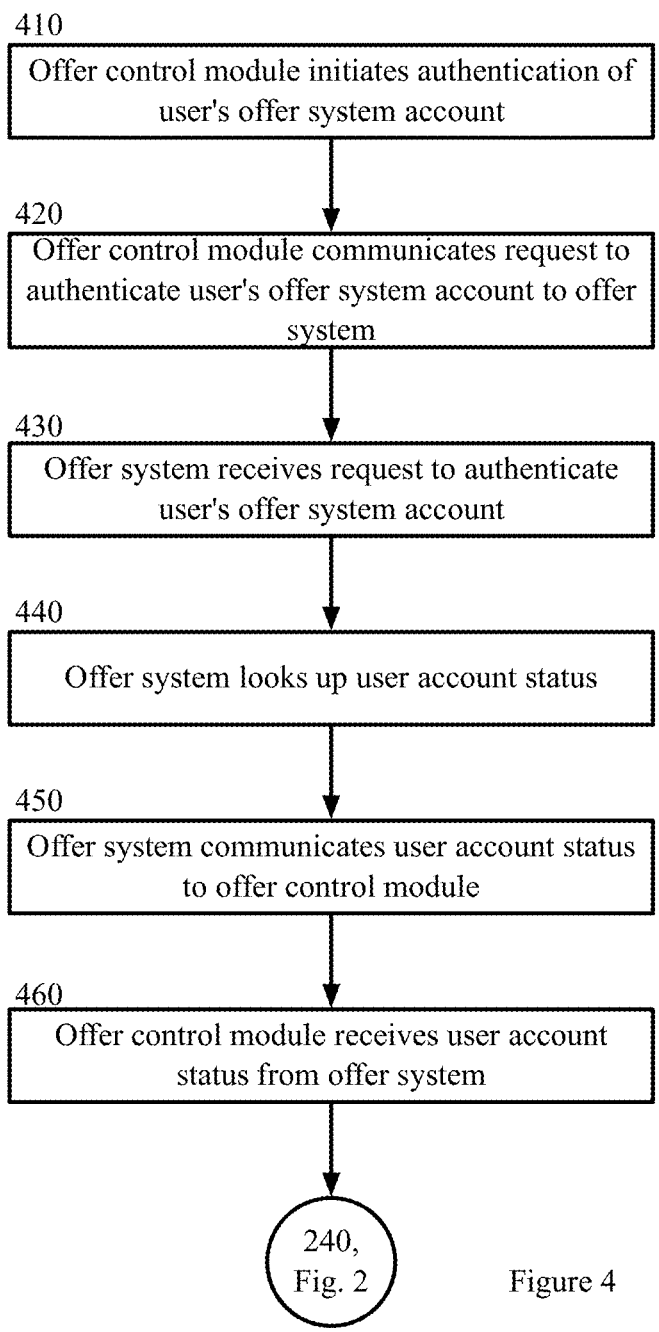
FIG. 4 is a block flow diagram depicting a method for determining account statuses, in accordance with certain example embodiments.

FIG. 4 is a block flow diagram depicting a method 230 for determining the user's 101 offer system 130 account status, in accordance with certain example embodiments, as referenced in block 230. The method 230 is described with reference to the components illustrated in FIG. 1.

In block 410, the offer control module 123 initiates authentication of the user's 101 offer system 130 account. In an example embodiment, the user has previously logged into a transferable and recognizable global account that is associated with the merchant application 125. In this embodiment, the merchant application 125 is associated with another web browser, so the user's login information from one page is transferred to the associated merchant application 125. In another example embodiment, the user has previously logged into the merchant application 125, and the user's login information was stored by the merchant application 125 so that the user is not prompted to re-enter his login information when returning to the web page. In yet another example embodiment, the user logs into a system account so that when the user enters a web page or application, the user's registration information is known or provided to the merchant application 125. In another example embodiment, the user's registration information is known by the offer system 130, or the user is prompted to log into the offer system 130 prior to entering the merchant application 125. In an example embodiment, the user 101 is required to log into the offer system 130 account before the methods described herein may be performed.

In an example embodiment, the offer control module 123 monitors for load event. In an example embodiment, the offer control module 123 receives an indication whenever a webpage or an application 125 page is loaded on the user device 120. In another example embodiment, the offer control module 123 continuously monitors or periodically monitors the user device to determine when a load event occurs.

In block 420, the offer control module 123 communicates a request to authenticate the user's 101 offer system 130 account to the offer system 130. In an example embodiment, the request is communicated to the button rendering module 135 resident on the offer system 130. In an example embodiment, the request comprises an identity of the merchant system 110 and an identity of the user 101. In another example embodiment, the offer control module 123 communicates these details in response to a request by the offer system 130 or in multiple communications to the offer system 130.

In block 430, the offer system 130 receives the request to authenticate the user's 101 offer system 130 account.

In block 440, the offer system 130 determines the user's 101 account status. In an example embodiment, the button rendering module 135 cross-references the identity of the merchant system 110 transmitted in block 420 with the offer saved in the data storage unit 137. In an example embodiment, one or more of the offers are applicable to a transaction with a specific merchant system 110, as defined by the terms and conditions of the offer redemption code. The button rendering module 135 reviews the terms and conditions of the offers and determines whether the offers are applicable to a transaction with the merchant system 110.

In an example embodiment, the button rendering module 135 determines which of the offers applicable to a transaction with the merchant system 110 can be applied. In an example embodiment, each offer will have one or more structured rules or conditions that the offer system 130 can understand without human intervention. These rules include, but are not limited to, a merchant identification (for example, $10 any purchase with Merchant X), a purchase threshold (for example, receive $10 back on a single purchase of more than $50 from the merchant system 110), a minimum number of purchases from the merchant (for example, receive $10 back on your tenth purchase from the merchant system 110), a time restriction (for example, receive $10 back for a purchase on Wednesday), a product or category restriction (for example, receive $10 back when you purchase a specific product or a product from a specific department), an expiration date, a product limitation, a user 101 limitation, and a limited number of redemptions. In an example embodiment, these rules are set by merchant system 110 at the time the redemption offer is created and reviewed by the offer system 130 before the offer is transmitted to the offer control module 123 and/or before offer redemption is applied.

In an example embodiment, the button rendering module 135 reviews the terms of the offer and the information from the request for the user's 101 offer system 130 account status to determine which of the offers are applicable to a transaction with the merchant system 110. For example, the button rendering module 135 may determine if the user 101 has a global offer applicable to a purchase with the merchant system 110 or an offer provided by the offer system 130 applicable to a purchase with any merchant system 110. In an example embodiment, a global offer is an offer that that may be applied to any purchase with a merchant system, for example 10% all items for sale by Merchant System A.

In another example embodiment, the button rendering module 135 reviews the redemption terms of the offer and provides recommendations for offers that may be applicable if the user 101 performs additional action on the merchant application 125.

In block 450, the offer system 130 communicates the user's 101 account status to the offer control module 123. In an example embodiment, the button rendering module 135 has identified an offer applicable to a transaction with the merchant system 110 in block 440 and the offer system 130 communicates the offer to the offer control module 123. In another example embodiment, the offer system 130 was unable to identify the user's 101 offer system 130 account and the offer system 130 communicates a request to the offer control module 123 to prompt the user 101 to log in. In another example embodiment, the button rendering module 135 was unable to identify an offer application to a transaction with the merchant without receiving additional information such as items selected, shipping information, and payment account information. In this embodiment, the offer system 130 communicates a request for more information to the offer control module. In another example embodiment, the offer system 130 communicates an affirmative account response to the offer control module 123. In another example embodiment, the user 101 is not required to maintain or log into an offer system 130 account. In this embodiment, the offer system 130 will respond with offers available to any user 101, including those who have not logged in or created an offer system 130 account.

In block 460, the offer control module 123 receives the user's 101 offer system 130 account status from the offer system 130.

The method 230 then proceeds to block 240 in FIG. 2.

Returning to FIG. 2, in block 240, the offer control module 123 determines whether the user 101 is logged into the offer system 130. In an example embodiment, the offer control module 123 receives an indication from the offer system 130 in block 460 in FIG. 4. In another example embodiment, block 230 may be performed at any time prior to the rendering of an offer on the control button.

If the user 101 is not logged into the offer system 130, the method 200 proceeds to block 245. In block 245, the user 101 is prompted to log into the offer system 130. In another example embodiment, the user 101 is not required to log into and/or maintain an offer system 130 account. In this embodiment, the offer system 130 maintains offers that may be redeemed by any user and the offer button 610 is rendered for the user 101 as a "guest" user.

From block 245, the method 200 proceeds to block 250.

Returning to block 240, if the user 101 is logged into the offer system 130, the method 200 proceeds to block 250.

In block 250, the merchant application 125 loads on the user device 120.

In block 260, the offer button 610 is rendered on the merchant application 125. In an example embodiment, the offer button 610 is a button, link, or other control, such that selection of the button comprises the activation of the matter the button controls. For example, selection of the button on the web page allows the user 101 to activate a further action controlled by the button. The button is displayed as available or active for the user 101 to press or otherwise select the button to attempt to access the content controlled by the button. In another example embodiment, the button is displayed as a URL link in the text displayed on the user interface 121 of the merchant application 125. The link is displayed a selectable by the user 101 so that the user may click, press or otherwise select the link to access the content controlled by the link. In another example embodiment, the button is a tab displayed on the user interface 121 of the merchant application 125 or website. The tab is displayed as selectable by the user 101 so that the user may click, press or otherwise select the tab to access content controlled by the tab.

In an example embodiment, the offer button 610 is rendered to display the offer available for redemption by the user 101 for a transaction with the merchant system 110. For example, the offer button 610 can display an offer amount, the color or style of the button can be changed to indicate an offer is applicable, the text displayed on the button can be changed, the button can flash or display animations, or other suitable indications of the available offer.

In another example embodiment, the offer button 610 is rendered to display an indication that an offer is available if the user 101 performs an additional action. For example, the offer button 610 may be rendered to display an indication that the user 101 has an offer for $10 off a $50 purchase or an indication that if the user 101 selection $50 worth of goods/services, the $10 offer may be applied.

In block 270, the offer control module 123 monitors the user's 101 interaction with the merchant application 125 to determine whether a second or subsequent offer is available for redemption. In an example embodiment, the offer control module 123 receives an indication whenever a page is loaded in the merchant application 125 on the user device 120. In another example embodiment, the offer control module 123 continuously monitors or periodically monitors the application to determine when an action is taken. In another example embodiment, the current state of the user's shopping cart, registry, or wish list is monitored. In this embodiment, any changes in the current state (for example, adding or removing items) are determined. In another example embodiment, the offer control module 123 monitors the user's 101 interaction with the merchant application 125 and the current state of the user's shopping cart, registry, or wish list. The method for monitoring the user's 101 interaction with the merchant application 125 is described in more detail hereinafter with reference to the methods described in FIG. 5.

Figure 5:
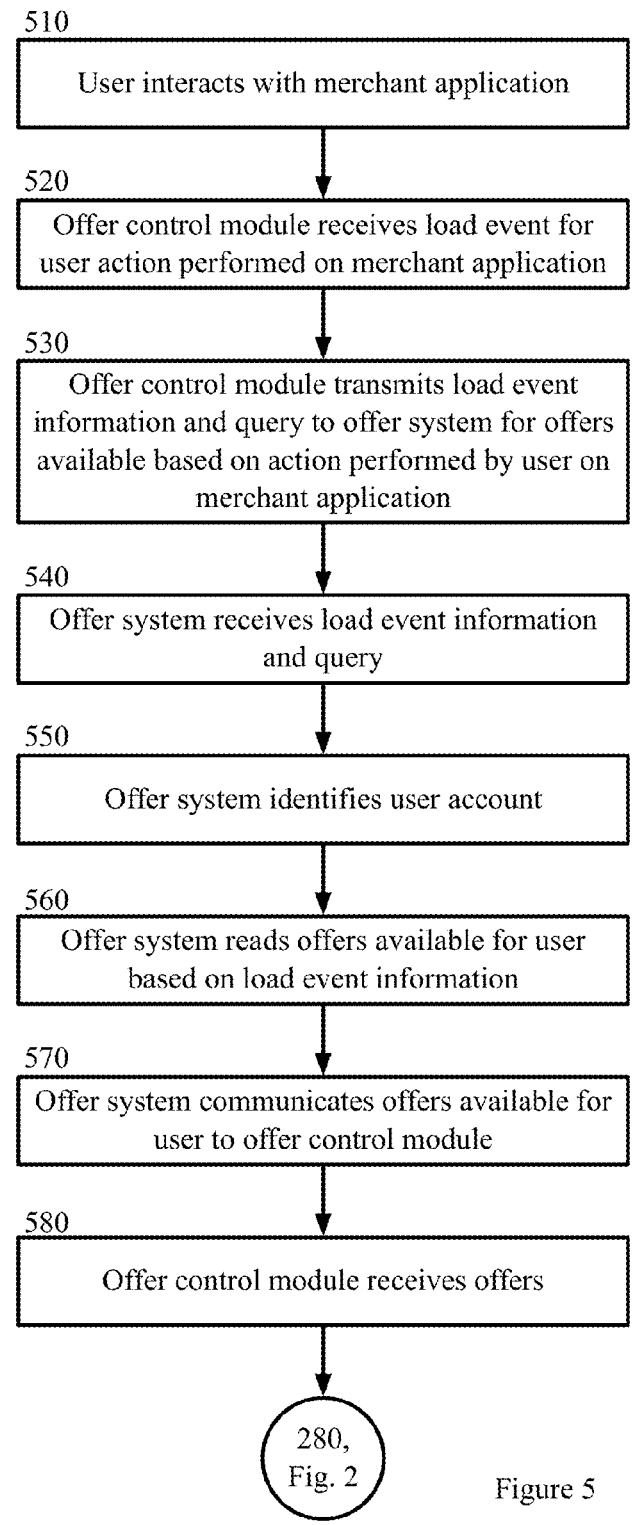
FIG. 5 is a block flow diagram depicting a method for monitoring interactions on merchant services, in accordance with certain example embodiments.

FIG. 5 is a block flow diagram depicting a method 270 for monitoring the user's 101 interaction with the merchant application 125, in accordance with certain example embodiments, as referenced in block 270. The method 270 is described with reference to the components illustrated in FIG. 1.

In block 510, the user 101 interacts with the merchant application. In an example embodiment, the user 101 selects an item to view more information, to view reviews, to view comparable products, to add to a wish list/registry, to add to a shopping basket, or to perform additional actions. In another example embodiment, the user 101 has previously selected items to add to a shopping basket and the user 101 selects to pay with a digital wallet account or specified financial account. In yet another example embodiment, the user 101 has entered shipping information, deleted an item from the shopping basket, conducted a search, or performed any action on the merchant application.

In block 520, the offer control module 123 receives a load event for the user 101 action performed on the merchant application. In an example embodiment, the load event for the user 101 action comprises an indication of the type of action taken (for example, the user 101 has selected Item A to read additional information about the product). In another example embodiment, the load event comprises an identification of the merchant system 110 and an identification of the user 101.

In block 530, the offer control module 123 transmits the load information and a query to the offer system 130 for offers available based on the action performed by the user 101 on the merchant application. In an example embodiment, the information is communicated to the button rendering module 135 resident on the offer system 130. In an example embodiment, the request comprises an identity of the merchant system 110 and an identity of the user 101. In another example embodiment, the offer control module 123 communicates these details in response to a request by the offer system 130 or in multiple communications to the offer system 130. In an example embodiment, the request comprises a relevant application state (for example, the contents of the user's 101 shopping cart). In yet another example embodiment, the request comprises incremental actions or differences from the last application state communicated to the offer system 130.

In block 540, the offer system 130 receives the load event information and the query for available offers.

In block 550, the offer system 130 identifies the user's 101 offer system 130 account. In an example embodiment, the button rendering module 135 references the identity of the user 101 transmitted in blocks 530 and/or 420. In an example embodiment, the offer system 130 reviews or searches user accounts and identifies the account associated with the identity of the user 101. In another example embodiment, the offer system 130 reviews or searches records maintained by the offer system 130 and identifies records associated with the identity of the user 101. In another example embodiment, the user 101 is not logged into an offer system 130 account and the offer system 130 identifies the user 101 as a "guest." In yet another example embodiment, the user 101 is logged into multiple offer system 130 accounts and the offer system 130 determines which account comprises the best available offers for the user 101.

In block 560, the offer system 130 reads the offers available for redemption by the user 101 based on the load event information. In an example embodiment, the button rendering module 135 reviews the terms and conditions of the offers and determines whether the offers are applicable based on the action taken by the user 101 in the merchant application. For example, if the user 101 selected Product A to review additional information, the offer system 130 will determine whether the user 101 has an offer applicable to a purchase of Product A. In another example, if the user 101 has added Product A to the user's 101 shopping basket, the offer system 130 will determine whether the user 101 has an offer applicable to the purchase of Product A or a purchase with the merchant system 110 based on the total sales amount of the shopping basket (for example, $10 off a $50 purchase).

In an example embodiment, the offer system 130 is able to identify items in the shopping basket and/or items viewed on the merchant application. In an example embodiment, the button rendering module 135 identifies items from the load event information transmitted by the offer control module 123. In another example embodiment, the offer control module 123 may capture the load event for a particular item on the merchant application and then a load event for the shopping basket. The offer control module 123 may transmit the product identification information captured from the item page on the merchant application page with the load event information for the shopping basket. In another example embodiment, the offer control module 123 reviews the user's 101 browser history or the load events for items viewed by the user 101 and transmit information regarding the items browsed with the load event information. The button rendering module 135 may then determine and identity of items based on the browser history. In another example embodiment, the offer control module 123 may use smart logic to otherwise determine the identity of the items and transmit the identity with the load event information.

In an example embodiment, the button rendering module 135 determines if offer redemption codes are applicable to the action taken by the user 101. In an example embodiment, the button rendering module 135 cross-references the action taken by the user 101 or identity of the items with the offers saved in the data storage unit 137. In an example embodiment, one or more of the offers are applicable to a specific item, as defined by the terms and conditions of the offer. The button rendering module 135 reviews the terms and conditions of the offers and determines whether the offers are applicable to the item.

In an example embodiment, each offer will have one or more structured rules or conditions that the offer system 130 can understand without human intervention. These rules include, but are not limited to, a purchase threshold (for example, receive $10 back on a single purchase of more than $50 from the merchant system 110), a minimum number of purchases from the merchant (for example, receive $10 back on your tenth purchase from the merchant system 110), a time restriction (for example, receive $10 back for a purchase on Wednesday), a product or category restriction (for example, receive $10 back when you purchase a specific product or a product from a specific department), an expiration date, a product limitation, a user 101 limitation, and a limited number of redemptions. In an example embodiment, these rules are set by merchant system 110 at the time the redemption offer is created and reviewed by the offer system 130 before the offer is transmitted or applied. In another example embodiment, each offer will have no rules or conditions associated with it. For example, an offer for $10 off any purchase with any merchant.

In an example embodiment, the offer control module 123 reviews the terms of the offer and the load event information to determine which of the offers is applicable to the action taken by the user 101. In this embodiment, the offer system 130 transmits the offers available for redemption by the user 101 to the offer control module 123, and the offer control module 123 reviews the terms of the offer to determine which of the offers is applicable to the action taken by the user 101. In an example embodiment, the offer control module 123 makes performs the function of the offer system 130 previously described.

In another example embodiment, the offer control module 123 reviews the redemption terms of the offer and provides recommendations for offers that may be applicable if the user 101 performs an additional action (for example, adds $5 more to the user's 101 shopping basket). In this embodiment, the offer system 130 transmits the offers available for redemption by the user 101 to the offer control module 123, and the offer control module 123 reviews the terms of the offer to determine which of the offers is applicable to the action taken by the user 101. The offer control module 123 also determines which offers, if redeemed, would provide the user 101 with the greatest savings. The offer control module 123 determines what additional action must be taken by the user 101 to satisfy the terms of the offer that would provide the user 102 with the greatest savings and notifies the user 101 of the additional action required.

In block 570, the offer system 130 communicates the available offers to the offer control module 123. In an example embodiment, the offer system 130 transmits the offer that provides the greatest savings to the user 101. In another example embodiment, the offer system 130 transmits multiple offers and provides an indication of the best savings for the user 101. In yet another example embodiment, the offer control module 123 determines which offer provides the greatest savings to the user 101.

In block 580, the offer control module 123 receives the offers.

The method 270 then proceeds to block 280 in FIG. 2.

Returning to FIG. 2, in block 280, the offer button 610 is rendered to display an offer value applicable to the current state of the user's 101 interaction with the merchant application 125. For example, if the user 101 has selected an item to review and the user 101 has a $5 off offer for that item, the offer button 610 is rendered to display an indication of the $5 off offer.

In an example embodiment, the offer button 610 can display an offer amount, the color or style of the button can be changed to indicate an offer is applicable, the text displayed on the button can be changed, the button can flash or display animations, or other suitable indications of the available offer. In an example embodiment, the text displayed corresponds to a description or amount of the offer received from the offer system 130 in block 580 of FIG. 5. In this embodiment, the offer button 610 is tied to the corresponding offer, such that if the user 101 clicks on the offer button 601, the corresponding offer is applied to the user's 101 transaction with the merchant, so long as the transaction continues to meet the terms of the offer.

In another example embodiment, the offer button 610 is rendered to display an indication that an offer is available if the user 101 performs an additional action. For example, the offer button 610 may be rendered to display an indication that the user 101 has an offer for $10 off a $50 purchase or an indication that if the user 101 selection $50 worth of goods/services, the $10 offer may be applied.

In an example embodiment, the offer button 610 is tied to the corresponding offer. In this embodiment, the offer cannot be applied until the user 101 takes additional action to fulfill the terms of the offer. In an example embodiment, if the user 101 clicks on or otherwise selects the offer button 610 before performing the additional action required to fulfill the terms of the offer, the offer will not be applied to the transaction. In another example embodiment, the user 101 will be notified that the offer cannot yet be applied when the offer button 610 is selected. For example, the text of the offer button 610 may be changed to notify the user 101 that the offer cannot yet be applied, a pop-up window or other alert may be displayed on the user interface 121 to notify the user 101, or the offer button 610 may be grayed out or otherwise unselectable until the user 101 takes the additional action required to fulfill the terms of the offer.

In an example embodiment, once the redemption terms of the offer are satisfied and the user 101 selects the offer button 610 to apply the offer to the transaction, the offer control module 123 applies the offer to the transaction with the merchant. In an example embodiment, the complete terms of the offer were transmitted by the offer system 130 to the offer control module 123 in block 570 of FIG. 5. In this embodiment, the offer control module 123 notifies the merchant system 110 of the offer and it is applied to the transaction with the merchant.

In another example embodiment, the user 101 is not required to press or otherwise select the offer button 610 to apply the offer. In this embodiment, the offer control module 123 automatically applies the offer, once the terms of the offer are satisfied without the user 101 having to indicate a desire to apply the offer.

In yet another example embodiment, once the redemption terms of the offer are satisfied, the offer control module 123 notifies the offer system 130, and the offer system 130 communicates the terms of the offer to the merchant system 110 to redeem the offer.

In block 290, the user 101 initiates further action on the merchant application 125 and the methods described in blocks 270 and 280 are repeated as necessary for each action the user 101 performs.

Other Example Embodiments

Figure 9:
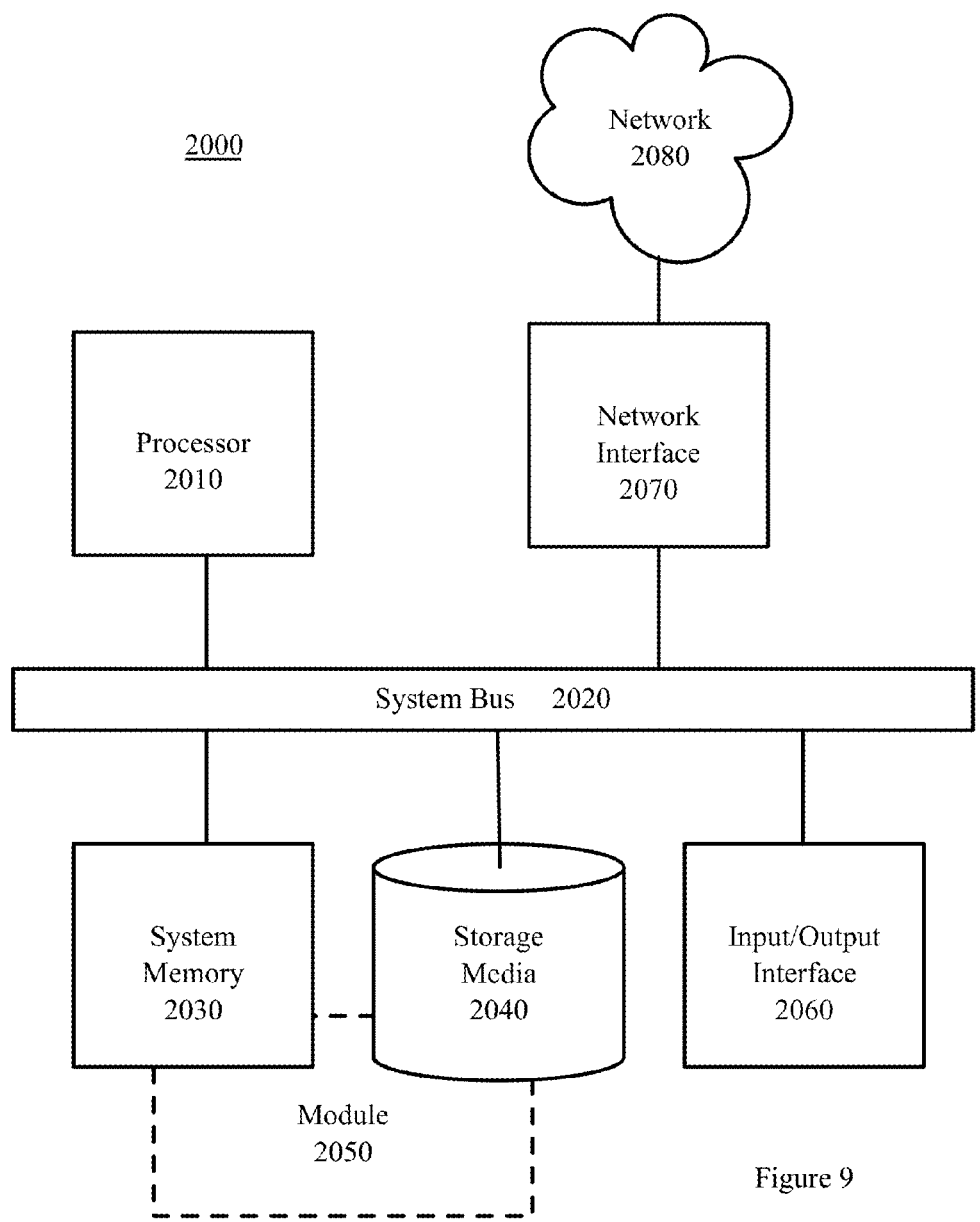
FIG. 9 is a block diagram depicting a computer machine and module, in accordance with certain example embodiments.

FIG. 9 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with an opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the invention claimed herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to render offer controls on merchant services, comprising:
    detecting, by a computing device of a user, that a third-party merchant shopping application has been loaded into a memory on the computing device for execution;
    communicating, by the computing device, the first input to an offer computing system, the offer computing system maintaining an account for the user comprising two or more offers selected by the user;
    receiving, by the computing device and from the offer computing system, a first notification of a first offer available for redemption by the user, the offer computing system determining that the first offer is available for redemption by the user based on the detection and based on the two or more offers selected by the user associated with the user account for the user maintained by the offer computing system;
    generating, by the computing device, an offer control based on the first notification of the first offer available for redemption by the user, the offer control generated to provide a customized visual representation of the first offer on a user interface of the computing device;
    Presenting, by the computing device, the customized visual representation of the first offer via the offer control on a user interface of the computing device, the offer control comprising a first rendering indicating the first offer available for redemption by the user, the first offer selected from the two or more offers elected by the user and associated with the user account maintained by the offer computing system;
    receiving, by the computing device, an input indicating an action was taken by the user using the merchant service on the computing device;
    communicating, by the computing device, the input indicating that the action was taken by the user using the merchant service on the computing device to the offer computing system maintaining the account for the user comprising two or more offers selected by the user;
    receiving, by the computing device and to the offer computing system, a second notification of a second offer available for redemption by the user, the offer computing system determining the second offer is available for redemption by the user based on the input indicating that the action was taken by the user and based on the two or more offers associated with the account maintained by the offer computing system;
    producing, by the computing device, a revised offer control based on the second notification of the second offer available for redemption by the user, the revised offer control generated to provide a second customized visual representation of the second offer on a user interface of the computing device; and
    presenting, by the computing device, the second customized visual representation of second offer via the revised offer control on the user interface of the computing device, the revised offer control comprising a second rendering indicating the second offer available for redemption by the user, the second offer selected from the two or more offers selected by the user and associated with the user account maintained by the offer computing system.

2. The method of claim 1, wherein the communicated detection comprises one or more of a merchant identification, a user identification, and an offer computing system identification.

3. The method of claim 1, further comprising receiving, by the computing device, a selection of the two or more offers by the user, wherein the selection of the two or more offers associates the each of the two or more selected offers with the user account maintained by the offer computing system.

4. The method of claim 1, wherein the first offer comprises an offer applicable to the user for a purchase via the merchant service or an offer provided by the offer computing system applicable to the user for a purchase via the merchant service.

5. The method of claim 1, wherein the second input indicating that the action was taken by the user using the merchant service on the computing device comprises one or more of an indication that an item was placed in or removed from a shopping basket, shipping information was entered, payment information was entered, an item was added or removed from a wish list, an item was added or removed from a gift registry, a review of an item was selected, and additional information about an item or group of items was selected.

6. The method of claim 1, wherein the second offer comprises one or more of a coupon, a loyalty redemption, a gift card, and an offer redemption code applicable based on the action taken by the user using the merchant service.

7. The method of claim 1, wherein the first rendering of the offer control comprises one or more of a display of an offer amount, a color or offer control style change, a change in text displayed on the offer control, a flashing color or text, and a flashing or displayed animation.

8. The method of claim 1, further comprising:
    receiving, by the computing device, a second input indicating another action was taken by the user using the merchant service on the computing device;

communicating, by the computing device, the second input indicating that the another action was taken by the user using the merchant service on the computing device to the offer computing system maintaining the account for the user comprising the two or more offers selected by the user;

receiving, by the computing device and from the offer computing system, a third notification of a third offer available for redemption by the user, the offer computing system determining the third offer is available for redemption by the user based on the second input indicating that the another action was taken by the user and based on the two or more offers selected by the user and associated with the user account maintained by the offer computing system; and presenting, by the computing device, a further revised offer control on the user interface of the computing device, the further revised offer control comprising a third rendering indicating the third offer available for redemption by the user, the third offer selected from the two or more offers selected by the user and associated with the user account maintained by the offer computing system.

9. The method of claim 1, wherein the merchant service on the computing device is one or more of a web page, a merchant shopping service, and a stand-alone application.

10. The method of claim 1, wherein the offer control is an offer button.

11. A computer program product, comprising:
a non-transitory computer-readable medium having computer-executable program instructions embodied therein that when executed by a computer cause the computer to render offer controls on merchant services, the computer-readable program instructions comprising:

computer-readable program instructions to detect that a third-party merchant shopping application has been loaded into a memory on a computing device of a user for execution;

computer-readable program instructions to communicate the detection to an the offer computing system maintaining an account for the user comprising one or more offers selected by the user;

computer-readable program instructions to receive from the offer computing system, a first notification of a first offer available for redemption by the user, the offer computing system determining that the first offer is available for redemption by the user based on the detection and based on the one or more offers selected by the user and associated with the account maintained by the offer computing system;

computer-readable program instructions to produce an offer control based on the first notification of the first offer available for redemption by the user, the offer control generated to provide a customized visual representation of the first offer on a user interface of the computing device; and computer-readable program instructions to present the customized visual representation of the first offer via the offer control on the user interface of the computing device, the offer control comprising a first rendering indicating the first offer available for redemption by the user, the first offer selected from the one or more offers selected by the user and associated with the user account maintained by the offer computing system.

12. The computer program product of claim 11, wherein the communicated detection comprises one or more of a merchant identification, a user identification, and an offer computing system identification.

13. The computer program product of claim 11, wherein the first offer comprises an offer applicable to the user for a purchase via the merchant service or an offer provided by the offer computing system applicable to the user for a purchase via the merchant service.

14. The computer program product of claim 11, wherein the first rendering of the offer control comprises one or more of a display of an offer amount, a color or offer control style change, a change in text displayed on the offer control, a flashing color or text, and a flashing or displayed animation.

15. The computer program product of claim 11, further comprising:

computer-readable program instructions to receive a second input indicating an action was taken by the user using the merchant service on the computing device;

computer-readable program instructions to communicate the second input indicating that the action was taken by the user using the merchant service on the computing device to the offer computing system maintaining the account for the user comprising the one or more offers selected by the user;

computer-readable program instructions to receive from the offer computing system, a second notification of a second offer available for redemption by the user, the offer computing system determining the second offer is available for redemption by the user based on the second input indicating that the action was taken by the user and based on the one or more offers selected by the user and associated with the user account maintained by the offer computing system;

computer-readable program instructions to produce a revised offer control based on the second notification of the second offer available for redemption by the user, the revised offer control produced to provide a second customized visual representation of the second offer on a user interface of the computing device; and computer-readable program instructions to present the second customized visual representation of second offer via the revised offer control on the user interface of the computing device, the revised offer control comprising a second rendering indicating the second offer available for redemption by the user, the second offer selected from the one or more offers selected by the user and associated with the user account maintained by the offer computing system.

16. The computer program product of claim 15, wherein the second input indicating that the action was taken by the user using the merchant service on the computing device comprises one or more of an indication that an item was placed in or removed from a shopping basket, shilling information was entered, payment information was entered, an item was added or removed from a wish list, an item was added or removed from a gift registry, a review of an item was selected, and additional information about an item or group of items was selected.

17. A system for rendering offer controls on the merchant services, the system comprising:
a storage device; and
a processor communicatively coupled to the storage device, wherein the processor executes application code instructions that are stored in the storage device and that cause the system to:
maintain an electronic record for a user, the record having one or more offers selected by the user associated therewith;

detect that third-party merchant shopping application has been loaded into a memory on a computing device of the user for execution;

determine that a first offer is available for redemption by the user based on the detection and based on the one or more offers selected by the user and associated with the user account; and transmit, to a user computing device, a first notification of a first offer available for redemption by the user, the first offer selected from the one or more offers selected by the user and associated with the user account, wherein the user computing device generates an offer control to provide a customized visual representation of the first offer on a user interface of the computing device, the customized visual representation of the first offer comprising a first rendering indicating the first offer available for redemption by the user.

18. The system of claim 17, wherein the first offer comprises an offer applicable to the user for a purchase via the merchant service or an offer applicable to the user for a purchase via the merchant service.

19. The system of claim 17, wherein the first rendering of the offer control comprises one or more of a display of an offer amount, a color or offer control style change, a change in text displayed on the offer control, a flashing color or text, and a flashing or displayed animation.

20. The system of claim 17, wherein the processor is further configured to execute computer-executable instructions stored in the storage medium to cause the system to:

receive a first input indicating an action was taken by the user using the merchant service on the computing device;

determine that a second offer is available for redemption by the user based on the first input indicating that the action was taken by the user and based on the one or more offers associated with the user account; and transmit, to a user computing device, a second notification of the second offer available for redemption by the user, the second offer selected from the one or more offers selected by the user and associated with the user account, wherein the user computing device produces a revised offer control to provide a second customized visual representation of the second offer on a user interface of the computing device, the second customized visual representation of the second offer comprising a second rendering indicating the second offer available for redemption by the user.

21. The system of claim 17, wherein the first input indicating that the action was taken by the user using the merchant service on the computing device comprises one or more of an indication that an item was placed in or removed from a shopping basket, shipping information was entered, payment information was entered, an item was added or removed from a wish list, an item was added or removed from a gift registry, a review of an item was selected, and additional information about an item or group of items was selected.

* * * * *